(12) United States Patent
Ishizuka

(10) Patent No.: US 8,932,170 B2
(45) Date of Patent: Jan. 13, 2015

(54) PLANETARY GEAR DEVICE

(71) Applicant: Sumitomo Heavy Industries, Ltd., Tokyo (JP)

(72) Inventor: Masayuki Ishizuka, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/085,946

(22) Filed: Nov. 21, 2013

(65) Prior Publication Data

US 2014/0148295 A1 May 29, 2014

(30) Foreign Application Priority Data

Nov. 26, 2012 (JP) ................................ 2012-257924

(51) Int. Cl.
*F16H 57/04* (2010.01)
*B60K 17/04* (2006.01)

(52) U.S. Cl.
CPC .......... *B60K 17/046* (2013.01); *F16H 57/0427* (2013.01); *F16H 57/0479* (2013.01); *F16H 57/0471* (2013.01); *F16H 57/0486* (2013.01)
USPC ........................................................ 475/159

(58) Field of Classification Search
None
See application file for complete search history.

(56) References Cited

U.S. PATENT DOCUMENTS

| | | | |
|---|---|---|---|
| 6,817,962 B2 * | 11/2004 | Tanikawa | 475/159 |
| 8,215,454 B2 * | 7/2012 | Portlock et al. | 184/6.12 |
| 8,251,862 B2 * | 8/2012 | Burgman et al. | 475/348 |
| 8,353,797 B2 * | 1/2013 | Burgman et al. | 475/159 |
| 2008/0108471 A1 | 5/2008 | Deutsch et al. | |

FOREIGN PATENT DOCUMENTS

| | | |
|---|---|---|
| EP | 0738843 A2 | 10/1996 |
| EP | 2317182 A2 | 5/2011 |
| SU | 545804 A1 | 2/1977 |
| WO | 00/36317 A1 | 6/2000 |

OTHER PUBLICATIONS

Extended European Search Report issued in counterpart European Patent Application No. 13004891.1 dated Feb. 20, 2014 (6 pages).

* cited by examiner

*Primary Examiner* — Dirk Wright
(74) *Attorney, Agent, or Firm* — Buchanan Ingersoll & Rooney PC

(57) ABSTRACT

A planetary gear device comprises planetary shafts, a planetary gear supported on the planetary shafts via bearings, and an internally-toothed gear. The planetary shafts are arranged at positions offset from a shaft center of the internally-toothed gear. Orbital motion of the planetary shafts is restricted so as to retrieve rotation output from a casing integrated with the internally-toothed gear. Lubricant in which the bearings around some of the plurality of planetary shafts are immersed is sealed in the casing. The planetary gear device further comprises a retention part for retaining the lubricant on a part integrally rotated with the casing.

8 Claims, 6 Drawing Sheets

(PRIOR ART)

US 8,932,170 B2

PLANETARY GEAR DEVICE

BACKGROUND OF THE INVENTION

1. Field of the Invention

The present invention relates to a planetary gear device.

2. Description of the Related Art

Wheel drive units for driving wheels of a utility vehicle such as a forklift in which a planetary gear device as a reducer mechanism is built are known. FIG. 1 is a cross sectional view of such a wheel drive unit described in WO00/36317. A housing 9 of the wheel drive unit is fixed to a flange C by a bolt B. The flange C is fixed to a vehicle (not shown) by a bolt inserted through a bolt hole D. A planetary gear mechanism E embodying a reducer and a disk brake 6 are accommodated in the housing 9. A wheel (not shown) is tightened by bolts A to a hub 12 located farther away from the vehicle than the unit.

SUMMARY OF THE INVENTION

One embodiment of the present invention relates to a planetary gear device, comprising: planetary shafts; a planetary gear supported on the planetary shafts via bearings; and an internally-toothed gear. The planetary shafts are arranged at positions offset from a shaft center of the internally-toothed gear. Orbital motion of the planetary shafts is restricted so as to retrieve rotation output from a casing integrated with the internally-toothed gear. Lubricant in which the bearings around some of the planetary shafts are immersed is sealed in the casing. The planetary gear device further comprises a retention part for retaining the lubricant on a part integrally rotated with the casing.

By providing a part integrally rotated with the casing with a retention part for retaining the lubricant, the lubricant flowing out of the retention part is supplied to the bearings located between the planetary gears and the planetary shafts. This ensures that the bearings supporting the planetary gears can be sufficiently lubricated even if the amount of lubricant sealed in the casing is small.

The planetary gear device may be of simple planetary type or of eccentric oscillation and distributed-shaft type in which a plurality of eccentric shafts are arranged at positions offset from the center of an internally-toothed gear. The term "planetary shaft" refers to a planetary pin in the case of the simple planetary type and to an eccentric body shaft in the case of the eccentric oscillation and distributed-shaft type.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Normally, when a planetary gear device is used as a reducer, lubricant is sealed in the casing of the planetary gear device. In many cases, the amount of lubricant is just sufficient to immerse a part (e.g., the lower half) of the planetary gear device for the purpose of reducing resistance of stirring due to the rotation of components in the lubricant. The reduced output is retrieved from the carrier supporting planetary gears. In this configuration, the internally-toothed gear of the planetary gear device is fixed and the planetary gears are supported via bearings on a plurality of planetary shafts arranged at positions offset from the shaft center of the internally-toothed gear. The plurality of planetary shafts are rotated around the sun gear and the planetary gears supported by the planetary shafts are rotated around their own axes. Even if the amount of lubricant sealed in the casing of the planetary gear device is small, all of the bearings located between the planetary shafts and the planetary gears are successively immersed in the lubricant as the planetary shafts make an orbital motion. Therefore, no problems are created in terms of lubrication performance.

Meanwhile, in a structure in which orbital motion of the planetary shafts is restricted and the rotation output is retrieved instead from the internally-toothed gear (plus the casing integrated therewith), the bearings around the planetary shafts located above the oil level (the bearings located between the planetary shafts and the planetary gears) are not reached by the lubricant, resulting in insufficient lubrication, if the amount of lubricant sealed in the casing is small.

One embodiment of the present invention addresses a need to provide a structure of a planetary gear device of configured to retrieve reduced rotational force from the internally-toothed gear, in which the bearings around the planetary shafts, orbital motion of which is restricted, are sufficiently lubricated even if the amount of lubricant sealed in the casing is small.

Figure 1:
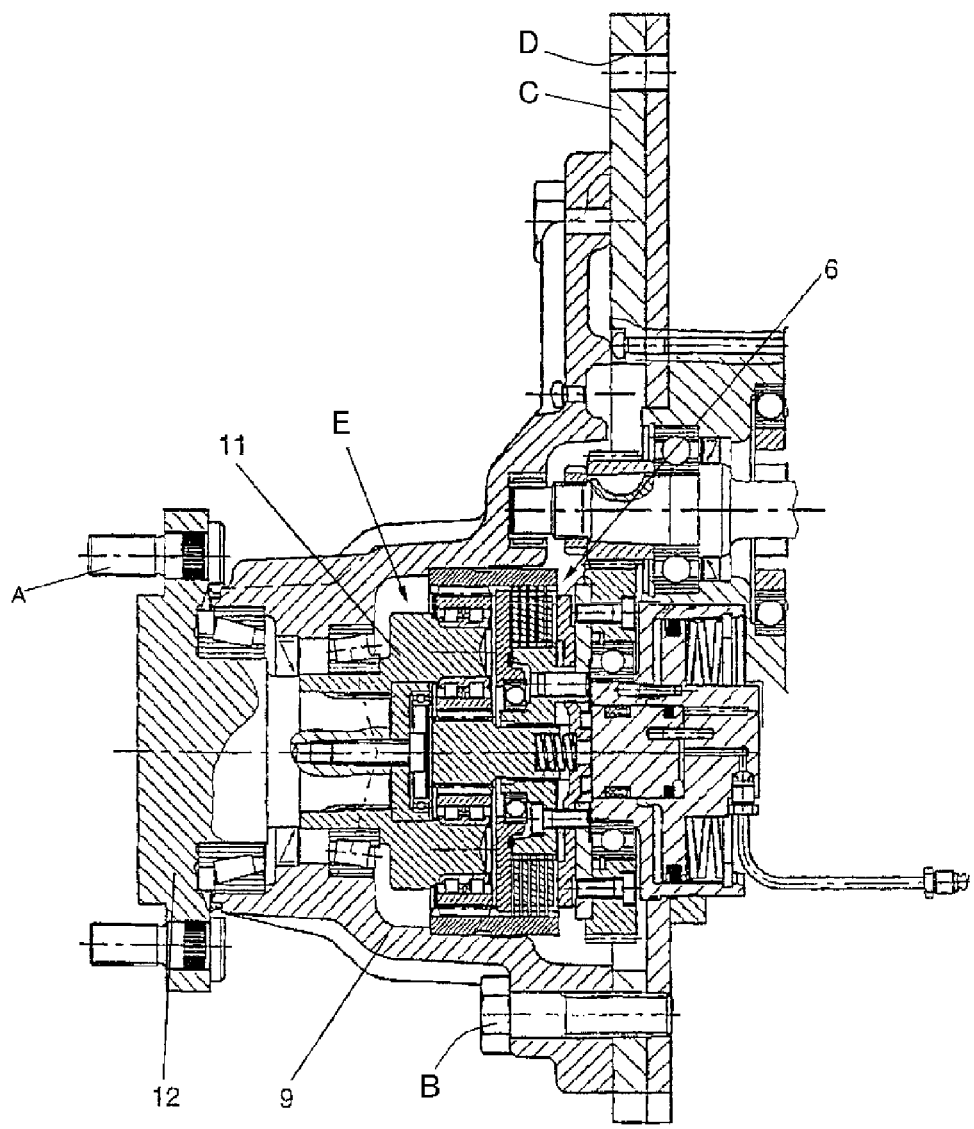
FIG. 1 is a cross sectional view of a wheel drive unit according to the related art.
Figure 2:
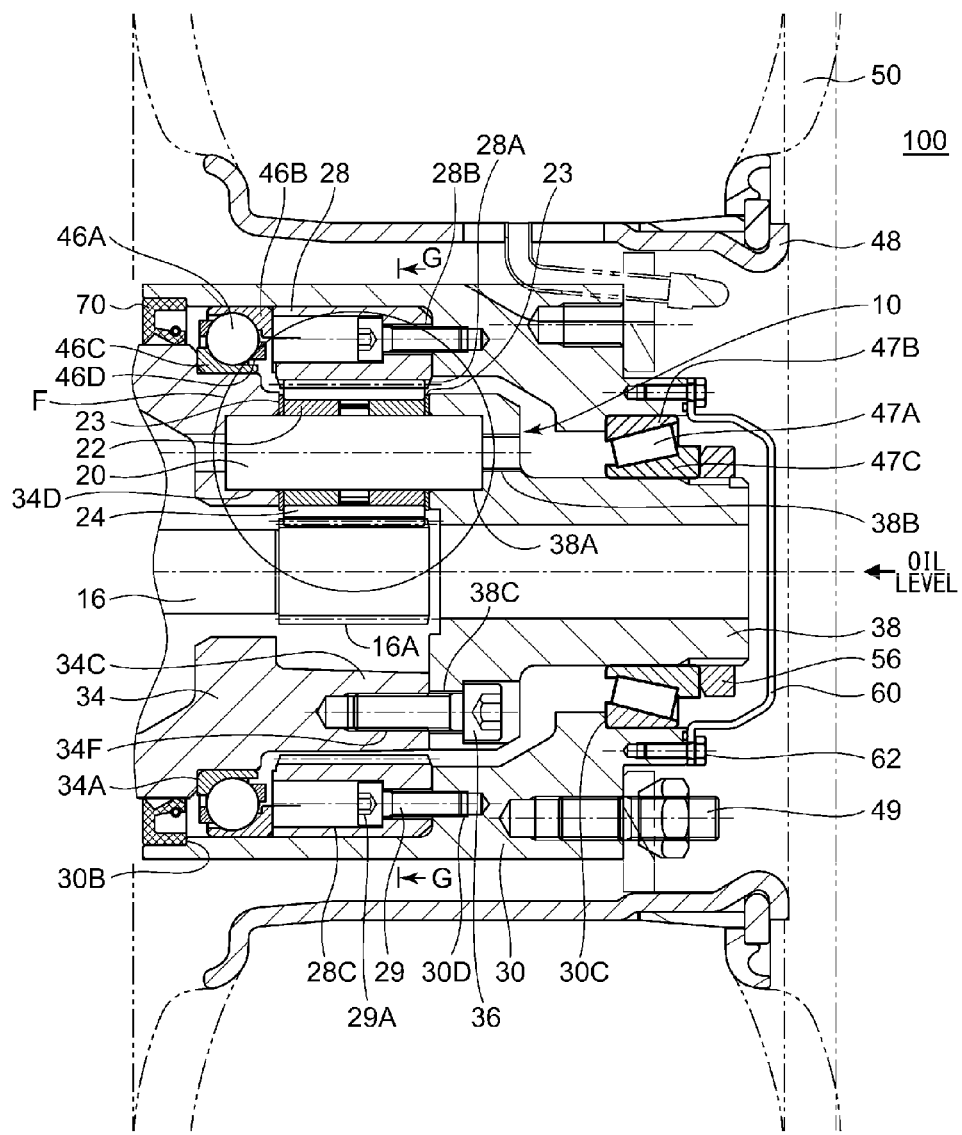
FIG. 2 is a cross sectional view that results when a wheel drive unit in which is built a planetary gear device according to an embodiment of the present invention is severed by a vertical plane that includes the central axis.
Figure 3:
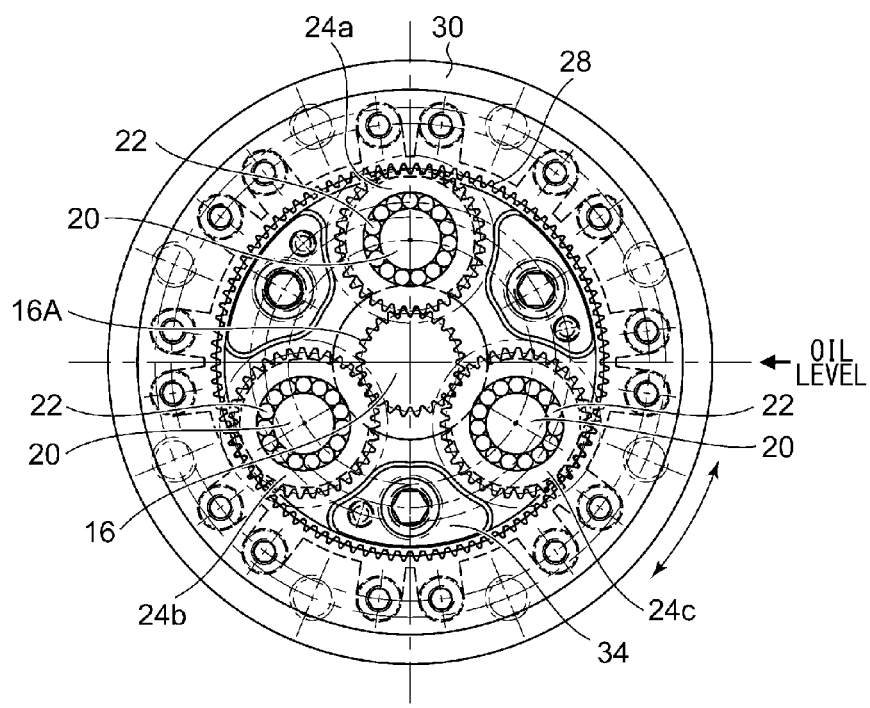
FIG. 3 is a G-G cross sectional view of FIG. 2.

FIG. 2 is a cross sectional view that results when a wheel drive unit 100 in which is built a planetary gear device according to an embodiment of the present invention is severed by a vertical plane that includes the central axis. FIG. 3 shows a cross section along line G-G on FIG. 2 that results when the wheel drive unit 100 is severed by a plane perpendicular to the central axis. The wheel drive unit 100 may be used in a utility vehicle such as a forklift.

The wheel drive unit 100 includes a reducer 10, which is a planetary gear device of simple planetary type, and a motor (not shown) joined to the reducer 10 in the left of FIG. 2, i.e., toward the vehicle.

The output shaft of the motor also functions as an input shaft 16 of the reducer 10. An externally-toothed gear 16A that functions as a sun gear in the planetary gear mechanism is press-fitted to a part of the outer lateral surface of the input shaft 16. An additional reducer mechanism such as a parallel axis gear mechanism or a planetary gear mechanism may be provided to precede the reducer 10, depending on the required reduction ratio.

A plurality of (three, in the illustrated case) planetary gears 24 are arranged to externally mesh with the externally-toothed gear 16A. The planetary gears 24 internally mesh with an internally-toothed gear 28A formed on the inner circumferential surface of an internally-toothed body 28. The internally-toothed body 28 and the casing 30 are formed as separate parts. By screwing a bolt 29 into a screw hole 30D formed in the casing 30 via a hole 28B formed in the internally-toothed body 28, the internally-toothed body 28 and the casing 30 are tightened to each other. A counterbore 28C may be formed in the internally-toothed body 28 so as to accommodate the head of the bolt 29 in the counterbore. The internally-toothed body 28 may be formed so as to be integrated with the casing 30.

A first carrier body 34 fixed to a vehicle frame (not shown) is located at the axial end of the planetary gears 24 toward the vehicle (toward the interior of the vehicle). At the axial end of the planetary gears 24 away from the vehicle (toward the exterior of the vehicle) is located a second carrier body 38 integrally joined with the first carrier body 34 via carrier bolts 36 and planetary pins 20.

The planetary pins (planetary shafts) 20 are supported by the first carrier body 34 and the second carrier body 38 so as to extend axially at positions offset from the shaft center of internally-toothed gear 28A. The ends of each of the planetary pins 20 are press-fitted into a recess 34D formed in the first carrier body 34 and a recess 38A formed in the second carrier body 38, respectively. By supporting the planetary pins 20 by the first and second carrier bodies 34 and 38, orbital motion of the planetary pins (planetary shafts) 20 is restricted.

The outer lateral surface of the intermediate part of each of the planetary pins 20 is contact with the responding one of the planetary gears 24 via a plurality of cylindrical skids 22, which are configured as a bearing for rotatably supporting the planetary gears 24 on the planetary pin 20. Axial movement of the plurality of cylindrical skids 22 is restricted by plates 23 provided at both axial ends.

A column part 34C extending axially outward is formed in that part of the first carrier body 34 not supporting the planetary gears 24. A screw hole 34F is formed on the outer end face of the column part 34C in the axial direction. A counterbore 38C is formed in a part of the second carrier body 38 facing the column part 34C. By screwing the bolt 36 into the screw hole 34F via the counterbore 38C, the first and second carrier bodies 34 and 38 are tightened to each other.

A removal tap 38B running through the recess 38A from the end face facing the direction away from the vehicle is provided in the second carrier body 38. By screwing a bolt into the removal tap 38B so as to thrust the end face of the planetary pin 20 toward the vehicle, the second carrier body 38 can be easily removed from the planetary pin 20 press-fitted into the recess 38A. Such a removal tap may be provided in the neighborhood of the counterbore 38C of the second carrier body 38. In this case, the second carrier body 38 can be removed from the planetary pin 20 by thrusting the surface of contact between the column part 34C of the first carrier body 34 and the second carrier body 38 toward the vehicle by screwing a bolt into the removal tap.

The casing 30 of the reducer 10 is substantially cylindrically shaped. A first main bearing 46 is fitted in a recess 30A formed on the inner circumference of the casing 30 toward the interior of the vehicle. The casing 30 is rotatably supported on the outer circumference of the first carrier body 34 via the first main bearing 46. The casing 30 is provided with a reduced-diameter part toward the exterior of the vehicle. A second main bearing 47 is fitted in a recess 30C formed on the inner circumference of the reduced-diameter part. The casing 30 is rotatably supported on the outer circumference of the second carrier body 38 via the second main bearing 47. The first and second main bearings 46 and 47 may be press-fitted into the casing 30. Alternatively, the first and second main bearings 46 and 47 may be fitted in the casing 30, creating a gap, and then fixed to the casing 30 by a stopper ring (not shown).

The first and second main bearings 46 and 47 are open type bearings and are lubricated by the lubricant sealed in the casing 30 as described later.

A wheel 48 is joined via bolts 49 to the end face of the casing 30 away from the vehicle. A tire 50 of a forklift (not shown) is mounted to the wheel 48. The reducer 10 is accommodated within an axial range of the tire 50 (within the range denoted by dashed two dotted lines of FIG. 2).

A bearing nut 56 is screwed onto a thread formed on the outer circumferential surface of the second carrier body 38. An inner race 47C of the second main bearing 47 is in contact with the left end face of the bearing nut 56, and an outer race 47B of the second main bearing 47 is in contact with the recess 30C of the casing 30. An outer race 46B of the first main bearing 46 is in contact with the recess 30A of the casing 30, and an inner race 46C of first main bearing 46 is in contact with an inner race stopper surface 34A formed in the first carrier body 34. As a result, axial movement of the casing 30 in which the first and second main bearings 46 and 47 are fitted is restricted by the bearing nut 56.

By modifying the amount by which the bearing nut 56 is pushed when the second carrier body 38, the casing 30, and the main bearings 46 and 47 are assembled, the preload given to the main bearings 46 and 47 can be controlled.

A cover 60 covering the bearing nut from outside is attached by bolts 62 to the end face of the casing 30 further away from the vehicle than the bearing nut 56.

The inner race 46C of the first main bearing 46 is fitted onto a shoulder portion formed on the outer circumference of the first carrier body 34. Axial movement of the inner race 46C is restricted by the inner race stopper surface 34A toward the vehicle.

An oil seal 70 for sealing the gap between the inner circumference of the casing 30 and the outer circumferential surface (hereinafter, referred to as "oil seal seat surface") 34B of the first carrier body 34 is provided more toward the interior of the vehicle than the first main bearing 46. The oil seal 70 is fitted into a recess 30B formed on the inner circumference of the casing 30 such that a rip of the oil seal internally meshes with the oil seal seat surface 34B of the first carrier body 34.

A description will now be given of the action of the wheel drive unit 100. The rotation of the output shaft of the motor (not shown) is transmitted to the input shaft 16 of the reducer 10 via a spline. When the input shaft 16 is rotated, the sun gear 16A is rotated and the planetary gears 24, orbital rotation of which is restricted by the planetary pins 20, are rotated around their own axes. The casing 30, which is integrated with the internally-toothed gear 28A, is rotated at a rotational speed that is determined by differences in the number of teeth between the sun gear and the planetary gears and between the planetary gears and the internally-toothed gear and that is reduced from the rotation speed of the input shaft. Therefore, the rotation output of the reducer 10 is retrieved from the casing 30, causing the rotation of the tire 50 of the forklift via the wheel 48 fixed to the casing 30 by the bolts 49.

Lubricant is sealed in the casing 30 for accommodating the planetary gear device in order to lubricate rotatable or slidable components. In normal use, the lubricant of an amount just sufficient to immerse a part of the planetary gear device is sealed for the purpose of reducing resistance of stirring due to the rotation of components in the lubricant. For example, the oil level is as indicated by the arrows in FIGS. 2 and 3 when the output shaft is directed horizontally.

Figure 4:
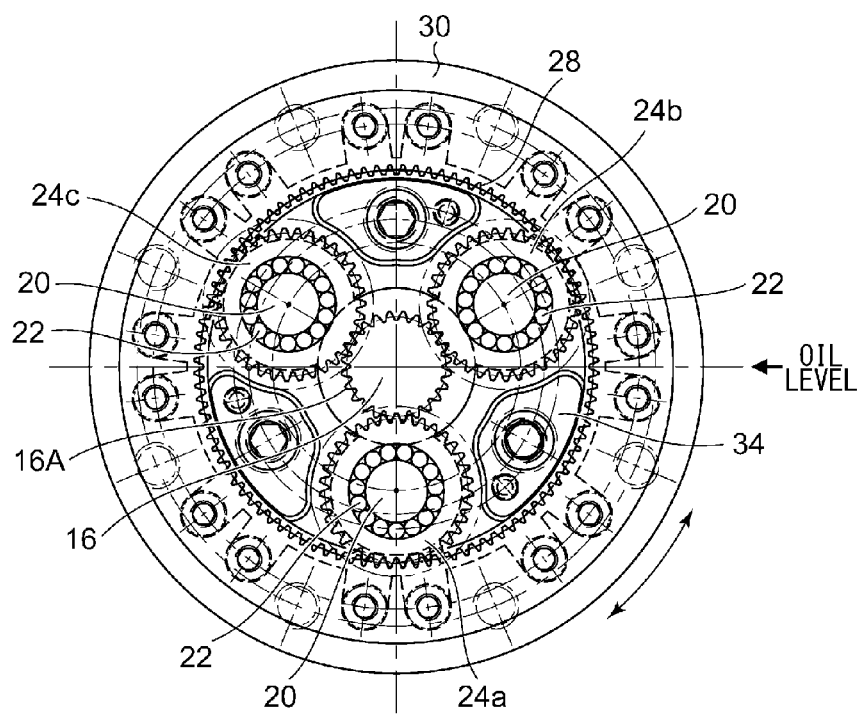
FIG. 4 is an alternative G-G cross sectional view of FIG. 2.

As described above, orbital motion of the planetary pins (planetary shafts) 20 is restricted, but the casing 30 integrated with the internally-toothed gear is rotated. Therefore, as will be learned from FIG. 3, the planetary pins 20 and the cylindrical skids 22 in two planetary gears 24b and 24c located below the oil level are completely immersed in the lubricant. Meanwhile, the planetary pins 20 and the cylindrical skids 22 in a planetary gear 24a above the oil level are completely outside the lubricant. If the wheel drive unit is arranged upside down as shown in FIG. 4, the planetary pins 20 and the cylindrical skids 22 in the two planetary gears 24b and 24c are completely outside the lubricant. As a result, the lubricant is not sufficiently supplied to some of the planetary pins 20 and the cylindrical skids 22, causing some issues such as rotation loss or increase of amount of heat in those parts.

The issues are addressed by the embodiment by providing a retention part on a part integrally rotated with the casing 30. The retention part is capable of retaining the lubricant inside when the retention part is below the oil level and discharging the retained lubricant when the retention part is outside the oil level.

A description will be given of the retention part with reference to FIG. 5, which is an enlarged view of a part F of FIG. 2. In this embodiment, a counterbore 28C for receiving the bolt 29 for tightening the internally-toothed body 28 to the casing 30 functions as the retention part for retaining the lubricant. In other words, when the counterbore 28C is located below the oil level, the lubricant enters the counterbore. When the counterbore 28C is outside the oil level, the lubricant flows out from the counterbore and a portion of the lubricant flows toward the cylindrical skids 22 and the planetary pins 20, lubricating the cylindrical skids 22 and the planetary pins 20. Normally, a plurality of counterbores are provided in the circumferential direction on the end face of the internally-toothed body 28 toward the vehicle. Therefore, the lubricant continues to be supplied while the casing 30 is being rotated. A hole functioning only as a retention part may be additionally provided at a radial position substantially identical to the position of the counterbore.

If the counterbore is not formed in the internally-toothed body 28, a tool hole 29A provided at the head of the bolt 29 may be used as a retention part.

Figure 5:
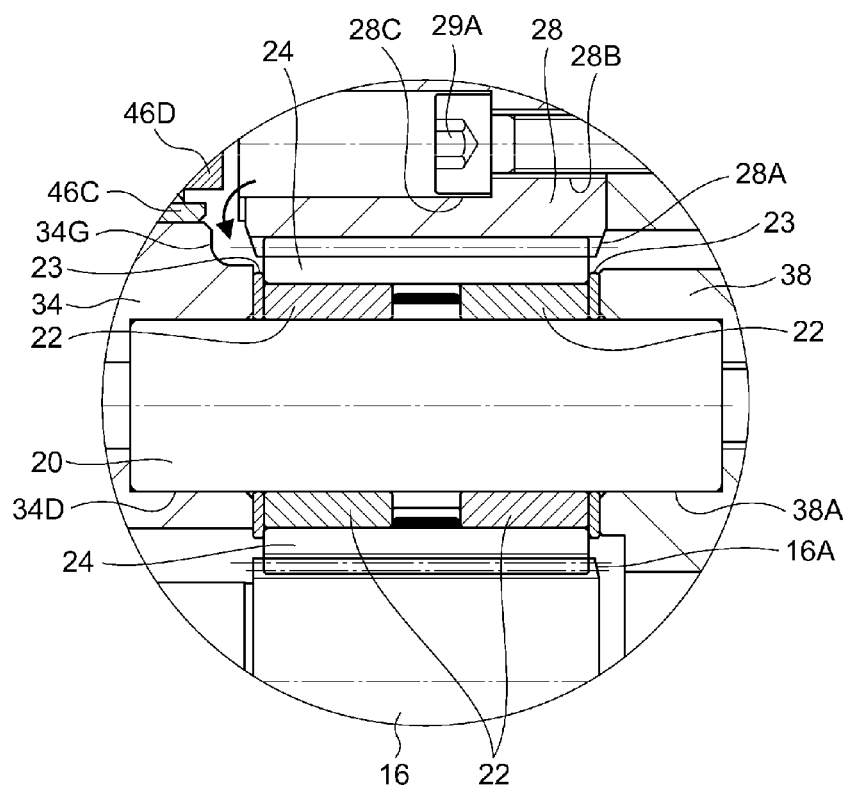
FIG. 5 is an enlarged view of a part F of FIG. 2 indicated by F.

As shown in FIG. 5, a chamfered or rounded guide part 34G may be formed at the end face of the first carrier body 34 away from the vehicle. This can properly guide the lubricant flowing out of the counterbore 28C, which functions as the retention part, to the cylindrical skids 22 and the planetary pins 20 and can increase the amount of lubricant supplied.

Figure 6A:
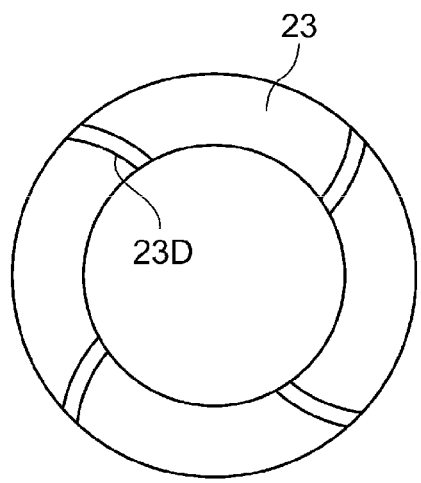
FIG. 6A shows an exemplary plate formed with guide grooves at an end face.

FIG. 6A is a top view of the plate 23 as viewed from outside the vehicle. Guide grooves 23D extending from the outer circumference toward the inner circumference are provided on the outer end face of the plate 23 toward the vehicle (the end face facing the skids 22). The guide grooves 23D can guide the lubricant flowing from the guide part 34G of the first carrier body 34 to the surface of contact between the planetary pins 20 and the skids 22.

Figure 6B:
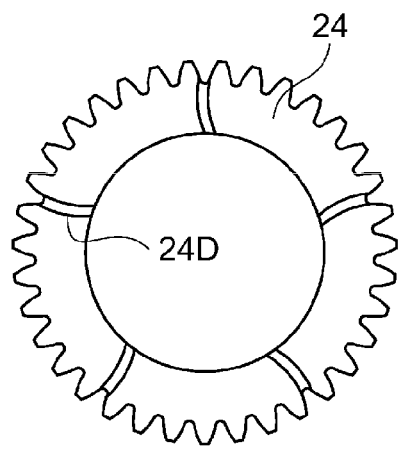
FIG. 6B shows an exemplary planetary gear formed with guide grooves on an end face.

FIG. 6B is a top view of one of the planetary gears 24 as viewed from inside the vehicle. As in the case of the plate 23, the end face of each of the planetary gears 24 toward the vehicle is also provided with guide grooves 24D extending from the outer circumference toward the inner circumference. The guide grooves 24D can guide the lubricant flowing from the guide part 34G of the first carrier body 34 to the surface of contact between the planetary pins 20 and the cylindrical skids 22.

As mentioned above, the outer race 46B of the first main bearing 46 is rotated along with the casing 30 so that the lubricant scooped up into the space inside the first main bearing 46. Therefore, the space may be positively used as the retention part for retaining the lubricant. In this case, a structure such as a groove for guiding the lubricant into the guide part 34G may be provided in a retainer 46D for retaining a plurality of rolling elements 46A at equal intervals.

As described above, the planetary gear device according to the embodiment is configured such that the rotation force is retrieved from the casing integrated with the internally-toothed gear by restricting orbital motion of the planetary shafts. A part integrally rotated with the casing is provided with a retention part for retaining lubricant so that the lubricant flowing out of the retention part is supplied to the bearings (cylindrical skids) located between the planetary gears and the planetary shafts. This ensures that the bearings supporting the planetary gears can be sufficiently lubricated even if the amount of lubricant sealed in the casing is small.

Described above is an explanation based on an exemplary embodiment. The embodiment is intended to be illustrative only and it will be obvious to those skilled in the art that various modifications to constituting elements could be developed and that such modifications are also within the scope of the present invention.

The hole such as the counterbore or the space inside the bearing is described as being used as the retention part for retaining the lubricant according to the embodiment. The retention part may have any of other arbitrary structures. For example, the retention part may be implemented by a blade member attached to the casing 30 or the internally-toothed body 28 and configured to scoop up the lubricant when the casing 30 is rotated.

The planetary gear reducer of simple planetary type is described by way of example. However, the reducer may not be of this type. For example, the present invention may be applied to planetary gear reducers of any type configured to retrieve rotation output from the casing integrated with the internally-toothed gear such as planetary gear reducers of eccentric oscillation and meshing type in which a plurality of eccentric body shafts (planetary shafts) are arranged at positions offset from the center of the internally-toothed gear, and bearings are arranged between externally-toothed gears in oscillation and the eccentric body shafts.

Priority is claimed to Japanese Patent Application No. 2012-257924, filed Nov. 26, 2012, the entire content of which is incorporated herein by reference.

What is claimed is:
1. A planetary gear device, comprising:
planetary shafts;
a planetary gear supported on the planetary shafts via bearings; and
an internally-toothed gear,
wherein the planetary shafts are arranged at positions offset from a shaft center of the internally-toothed gear,
wherein orbital motion of the planetary shafts is restricted so as to retrieve rotation output from a casing integrated with the internally-toothed gear, and
wherein lubricant in which the bearings around some of the planetary shafts are immersed is sealed in the casing,
the planetary gear device further comprising a retention part for retaining the lubricant on a part integrally rotated with the casing.
2. The planetary gear device according to claim 1,
wherein the retention part is embodied by a plurality of holes formed in a circumferential direction of the casing.

3. The planetary gear device according to claim 1,
wherein an internally-toothed body formed with the internally-toothed gear and the casing are separate members, and
wherein a tool hole provided at a head of a bolt for tightening the internally-toothed body to the casing functions as the retention part.

4. The planetary gear device according to claim 1,
wherein an internally-toothed body formed with the internally-toothed gear and the casing are separate members, and
wherein a counterbore configured to receive a bolt for tightening the internally-toothed body to the casing functions as the retention part.

5. The planetary gear device according to claim 1,
wherein a guide part configured to guide the lubricant flowing out of the retention part to the bearings is provided on a carrier member for supporting the planetary shafts.

6. The planetary gear device according to claim 1,
wherein a guide part configured to guide the lubricant flowing out of the retention part to the bearings is provided on an axial end face of each of the planetary gears.

7. The planetary gear device according to claim 1,
wherein a guide part configured to guide the lubricant flowing out of the retention part to the bearings is provided on each of plates configured to restrict axial movement of the bearings.

8. The planetary gear device according to claim 1,
wherein a space inside a casing bearing configured to rotatably support the casing functions as the retention part, and
wherein a guide part for guiding the lubricant to the bearings of the planetary gears is provided in a retainer for retaining rolling elements of the casing bearing.

* * * * *